Patented Oct. 24, 1922.

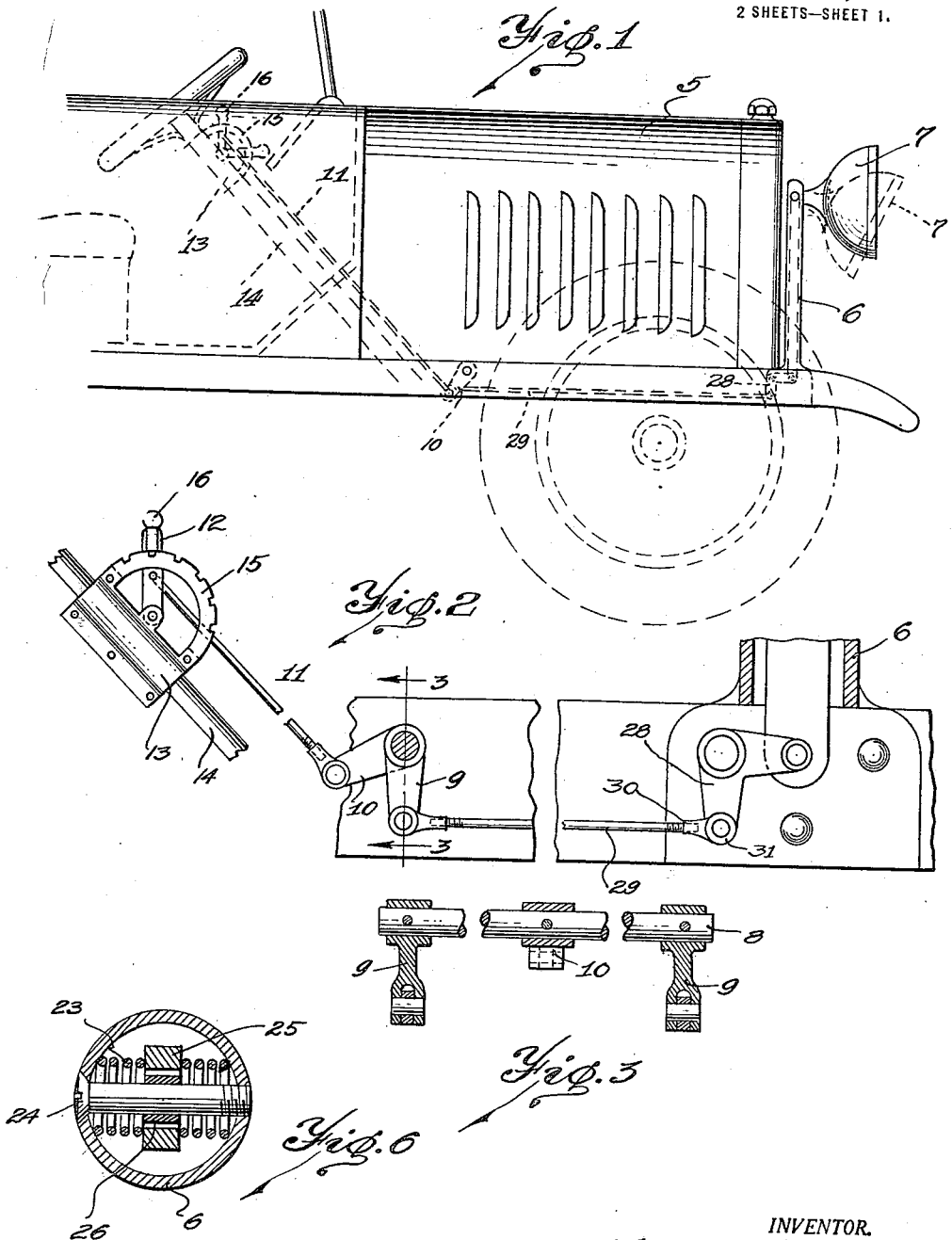

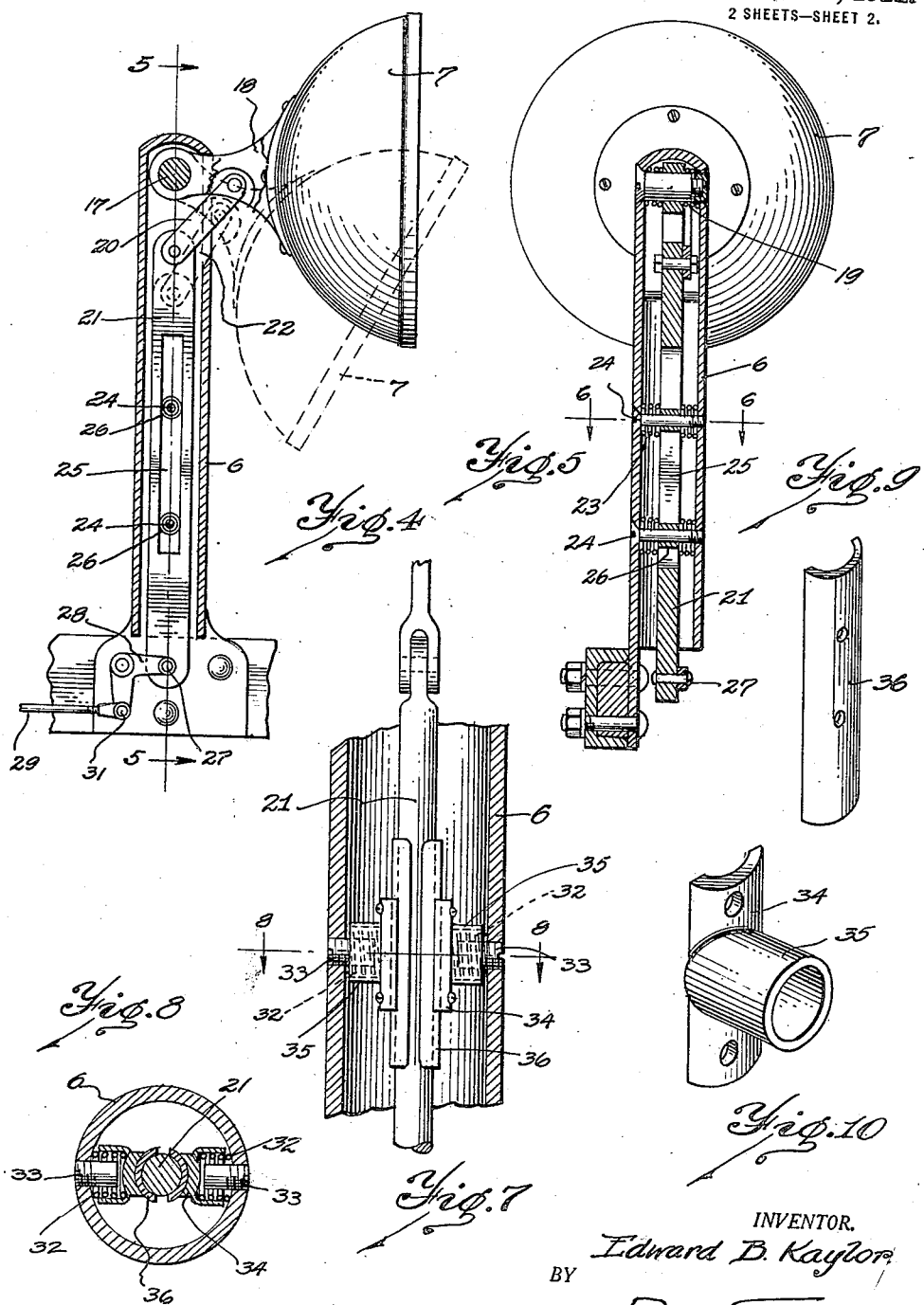

1,433,080

UNITED STATES PATENT OFFICE.

EDWARD B. KAYLOR, OF DETROIT, MICHIGAN.

CONTROL MECHANISM FOR HEADLIGHTS.

Application filed October 24, 1921. Serial No. 509,772.

*To all whom it may concern:*

Be it known that I, EDWARD B. KAYLOR, a citizen of the United States, and residing at Detroit, county of Wayne, and State of Michigan, have invented a new and Improved Control Mechanism for Headlights, of which the following is a specification.

This invention relates to an improved and simplified control mechanism for automobiles, and has for its primary object to provide headlights mounted for convenient adjustment to vary the distance of the projection of the light rays therefrom. With my improved control mechanism automobile headlights can be maintained with their lamps undimmed and when approaching a moving vehicle can be tilted downwardly from normal operative position to project their rays downwardly onto the road directly in front of the automobile to avoid the objectionable glare usually attendant on undimmed headlights.

Another object is to provide a simple and comparatively inexpensive mechanism for controlling both headlights in unison upon movement of a single lever conveniently mounted adjacent the driver's seat, as upon the steering post.

Other objects and advantages of my invention will be apparent from the following description wherein reference is made to the accompanying drawings illustrating a preferred embodiment of my invention, and wherein similar reference numerals designate similar parts throughout the several views.

In the drawings:—

Fig. 1 is a side elevation of the forward portion of an automobile equipped with my improved headlight control mechanism;

Fig. 2 is a detail elevation with parts broken away showing the link mechanism between the headlight and hand lever;

Fig. 3 is a detail section taken substantially on the line 3—3 of Fig. 2;

Fig. 4 is a sectional view through the headlight supporting standard;

Fig. 5 is a similar view at right angles to the section shown in Fig. 4, and is taken substantially on the line 5—5 of Fig. 4;

Fig. 6 is a cross section on the line 6—6 of Fig. 5;

Fig. 7 is an enlarged detail view showing a slightly modified embodiment of the flexible support for guiding the thrust rod in the headlight supporting standard;

Fig. 8 is a cross section on the line 8—8 of Fig. 7, and

Figs. 9 and 10 are detail perspective views of such guiding means.

Referring now to the drawings the numeral 5 designates an automobile body of any desired construction to which is bolted or otherwise suitably secured hollow standards 6 for supporting the headlight 7. A tubular standard 6 serves to support each headlight and is herein shown as bolted to the chassis or frame of the automobile 5, but it is to be understood that the standards can be mounted in any convenient position and secured by any desired means. Since the mounting of each headlight is similar and the mechanism for operating each headlight is identical and controlled from a single operating means common to both of the individual lamp tilting means, I have illustrated in detail only the construction of one headlight and the means for operating but one of the headlights. It will be noted in Figs. 1 and 3 that the shaft 8 journaled in the vehicle frame carries bracket arms 9 adjacent each end, one bracket arm being connected with the lamp tilting mechanism on one side of the machine and the other arm 9 operating similar lamp tilting mechanism on the opposite side of the machine. A single means for oscillating both bracket arms 9 when desired is connected centrally of the shaft 8, being herein shown as comprising a bracket arm 10 to which is pivotally mounted the adjustable link 11, the other extremity of which connects with the hand lever 12 pivoted upon a clamp 13 engaging the steering post 14.

A notched semicircular frame 15 co-operates with a dog 16 on the hand lever to hold the hand lever in definite angular positions whereby the extent of oscillation of the shaft 8 and bracket arms 9 is controlled at will by the operator.

Each tubular standard 6 carries adjacent its upper extremity a bolt 17 upon which is pivoted the supporting arm 18 of the head light 7. suitable resilient means such as coil springs 19 (see Fig. 5) serving to hold the supporting arm 18 centrally of the bolt and prevent lateral movement or rattling when the machine is vibrating. The upper extremity of the standard 6 is closed substantially as shown and the supporting arm 18 as well as the link 20 connecting the supporting arm with the thrust rod 21 extends through the forwardly facing slot 22 (see Fig. 4). The upper wall of such slot serves as a limiting member to control the upward swinging movement of the headlight and the lower wall of such slot 22 is adapted to be engaged by the link 20 to limit the downward swinging motion of the headlight. This slot, being but slightly wider than the supporting arm 18 and as short as can be constructed while permitting necessary angular motion of the headlights, does not permit the entrance of rain, dust, etc., to any appreciable degree, and it will be noted in Figs. 4 and 5 that the bottom of the tubular standard 6 is open to permit drainage of any moisture, etc., that may enter the standard.

The thrust rod 21 is centrally mounted in the hollow standard 6 and is spaced from the walls thereof by resilient means such as the coil springs 23 encircling bolts 24 fixed in the standard and passing through an elongated slot 25 in the thrust rod, sleeves 26 being preferably carried centrally of the bolts 24 and engaging the side walls of the slot 25. With this construction the thrust rod is guided for vertical movement and held against lateral movement so as not to rattle within the standard when the automobile is moving. The lower extremity of the thrust rod 21 is pivoted, as at 27, to one arm of the bell-crank lever 28, the other arm of which is connected by the adjustable rod 29 with the bracket arm 9 on the shaft 8 previously referred to. The rod 29 is preferably threaded adjacent each end to fit into threaded sockets 30 in the ears 31 encircling the pivot bolts of the bell-crank lever 28 and bracket arm 9 respectively, whereby the movement of the bell-crank lever can be regulated by the oscillation of the shaft 8, which as above described, is controlled by the extent of movement of the hand lever 12.

In Figs. 7 to 10 I have shown a slightly modified form of resilient guiding and supporting means for the thrust rod 21. The coil springs 32 surround bolts 33 carrying at their inner ends curved plates 34 (see Fig. 10) having hub portions 35 substantially enclosing the springs 32. The curved plates 34 preferably carry wear-plates 36 (see Fig. 9) adapted to contact the thrust rod 21, guiding it in its vertical movements and holding it against lateral or rattling movements. By providing the wear-plates 36 in pairs and arranging one pair at right angles to the other I can support the thrust rod 21 against movement in any lateral direction.

The operation of my improved headlight control mechanism is believed to be apparent. When driving along country roads or darkened streets the headlight lamps can be used undimmed, and by elevating the head lights 7 their light rays can be projected at any desired distance ahead of the automobile. To tilt the head light upwardly to lengthen distance of projection the hand lever 12 is rocked to oscillate the shaft 8, bracket arms 9, rods 29 and bell-crank levers 28 to impart an upward thrust to the thrust rod 21 and link 20. When approaching a moving vehicle, or if for any other reason it is desired to shorten the distance of projection of the light rays, the headlight 7 can be tilted downwardly even to where the rays strike the road immediately in front of the automobile, thereby lessening or entirely eliminating the headlight glare ordinarily so objectionable when undimmed headlights are employed.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim :—

1. In a device of the character described, a hollow standard having a slot adjacent its upper end, a lamp having an arm extending through said slot and pivoted within the standard, a longitudinally movable thrust rod arranged within the standard, a link connecting the upper portion of the thrust rod with the lamp arm, a bell-crank lever having one arm pivotally connected with the lower extremity of the thrust rod, and operative connections from the other arm of the bell-crank lever to move the thrust rod when desired.

2. In a device of the character described, a hollow standard having a slot adjacent its upper end, a lamp having an arm extending through said slot and pivoted within the standard, a longitudinally movable thrust rod arranged within the standard, a link connecting the upper portion of the thrust rod with the bracket arm, resilient means to prevent lateral movement of the thrust rod, a bell-crank lever having one arm pivotally connected with the lower extremity of the thrust rod, and operative connections from the other arm of the bell-crank lever to move the thrust rod when desired.

3. In a device of the character described, a hollow standard having a slot adjacent its upper end, a lamp having an arm extending through said slot and pivoted within the standard, a longitudinally movable thrust rod arranged within the standard, a link connecting the upper portion of the thrust rod with the bracket arm, spring pressed means contacting the thrust rod to prevent lateral movement thereof, a bell-crank lever having one arm pivotally connected with the lower extremity of the thrust rod, and operative connections from the other arm of the bell-crank lever to move the thrust rod when desired.

4. In a device of the character described, a hollow standard having a slot adjacent its upper end, a lamp having an arm extending through said slot and pivoted within the standard, a longitudinally movable thrust rod arranged within the standard, a link connecting the upper portion of the thrust rod with the bracket arm, spring pressed means contacting the thrust rod to prevent lateral movement thereof, a bell-crank lever having one arm pivotally connected with the lower extremity of the thrust rod, a link connected to the other arm of the bell-crank lever, a shaft having an arm to which the last mentioned link is connected, a hand lever, and connections from the hand lever to oscillate the shaft.

5. In a device of the character described, a pair of lamp supports mounted on opposite sides of an automobile and comprising hollow standards having slots adjacent their upper extremities, lamps having arms extending through said slots and pivoted within the standards, longitudinally movable thrust rods within the standards, links connecting the upper portions of the thrust rods with the lamp arms, bell-crank levers connected with the lower extremities of the thrust rods, and operative connections from the bell-crank levers to vertically move the thrust rods simultaneously, comprising a shaft having arms adjacent its ends, links connecting said arms to the bell-crank levers, a hand lever, and connections from the hand lever to oscillate the shaft.

6. In a device of the character described, a pair of lamp supports mounted on opposite sides of an automobile and comprising hollow standards having slots adjacent their upper extremities, lamps having arms extending through said slots and pivoted within the standards, longitudinally movable thrust rods within the standards, links connecting the upper portions of the thrust rods with the lamp arms, bell-crank levers connected with the lower extremities of the thrust rods, and operative connections from the bell-crank levers to vertically move the thrust rods simultaneously, comprising a shaft having arms adjacent its ends, adjustable links connecting said arms to the bell-crank levers, a hand lever, and connections from the hand lever to oscillate the shaft, including an adjustable link between the hand lever and shaft.

7. In a device of the character described, a hollow standard having a slot adjacent its upper extremity, a lamp having an arm extending through said slot and pivoted within the standard, a vertically movable thrust rod mounted within the standard, a link connecting the upper extremity of the thrust rod with the lamp arm, means for guiding the thrust rod in its vertical movement and restraining it from lateral movement, including wear-plates engaging the rod on opposite sides, and resilient means arranged between the wear-plates and the inner walls of the standard, and operative connections for vertically moving the thrust rod when desired.

8. In a device of the character described, a hollow standard having a slot adjacent its upper extremity, a lamp having an arm extending through said slot and pivoted within the standard, a vertically movable thrust rod mounted within the standard, a link connecting the upper extremity of the thrust rod with the lamp arm, means for guiding the thrust rod in its vertical movement and restraining it from lateral movement, including wear-plates engaging the rod on opposite sides, bolts mounted in apertures in the standard, and resilient means encircling said bolts between the wear-plates and the inner walls of the standard, and operative connections for vertically moving the thrust rod when desired.

EDWARD B. KAYLOR.

Witnesses:
HOWARD P. MORLEY,
Mrs. HOWARD P. MORLEY.